US008843106B2

(12) United States Patent
Pons Prieto et al.

(10) Patent No.: US 8,843,106 B2
(45) Date of Patent: Sep. 23, 2014

(54) SYSTEM AND METHOD FOR IMPROVING PRODUCTIVITY

(75) Inventors: Joan Pons Prieto, Barcelona (ES);
David Llort Casanova, Barcelona (ES);
Andre Angel, Plano, TX (US)

(73) Assignee: Work Meter, Inc., Plano, TX (US)

( * ) Notice: Subject to any disclaimer, the term of this patent is extended or adjusted under 35 U.S.C. 154(b) by 738 days.

(21) Appl. No.: 12/541,782

(22) Filed: Aug. 14, 2009

(65) Prior Publication Data
US 2010/0042706 A1 Feb. 18, 2010

Related U.S. Application Data

(60) Provisional application No. 61/189,129, filed on Aug. 15, 2008.

(51) Int. Cl.
*H04M 11/00* (2006.01)
*H04W 4/26* (2009.01)
*G06Q 10/06* (2012.01)
*H04W 24/00* (2009.01)

(52) U.S. Cl.
CPC .............. *G06Q 10/06* (2013.01); *G06Q 10/0639* (2013.01); *H04W 24/00* (2013.01); *H04W 4/26* (2013.01)
USPC ...... 455/405; 455/406; 455/414.1; 455/414.2

(58) Field of Classification Search
CPC .. G06Q 10/10; G06Q 10/063; G06Q 10/0639
USPC ............... 705/4, 3, 38, 37, 35, 30, 7.42, 7.38, 705/7.37, 7.36, 7.29; 709/250, 225, 224, 709/203, 246, 219, 213, 204, 223, 201, 218, 709/220; 702/188, 186; 719/313; 726/23, 726/22
See application file for complete search history.

(56) References Cited

U.S. PATENT DOCUMENTS

| | | | |
|---|---|---|---|
| 7,203,479 B2 * | 4/2007 | Deeds | 455/407 |
| 2005/0183143 A1 * | 8/2005 | Anderholm et al. | 726/22 |
| 2006/0090160 A1 * | 4/2006 | Forsythe et al. | 718/100 |
| 2006/0190725 A1 * | 8/2006 | Huang | 713/168 |

* cited by examiner

*Primary Examiner* — Waseem Ashraf
*Assistant Examiner* — Charles Murphy
(74) *Attorney, Agent, or Firm* — Haynes and Boone, LLP

(57) ABSTRACT

In some aspects, a method of the present disclosure includes collecting user activity data from a client device. The method also includes defining an activity-productivity map that defines a rule for determining a unit-of-productivity based on the activity data. A productivity metric may be determined using the user activity data and the rule for determining the unit of productivity. Upon determining the productivity metric, a visual representation of the productivity metric may be provided.

23 Claims, 12 Drawing Sheets

Fig. 1b

Dump events registered

<<< [1][2][3][4][5][6][7][8][9][10][11][12][13][14][15] >>>   — 172

| date | time | username | appname | activity | duration | data1 | data2 |
|---|---|---|---|---|---|---|---|
| 2008-1-24 | 00:00:00 | BSCOTT | IEXPLORE.EXE | 0 | 3600 | Salesforce.com - Windows Internet Explorer | https://login.salesfor |
| 2008-1-24 | 01:00:00 | BSCOTT | IEXPLORE.EXE | 0 | 3600 | Salesforce.com - Windows Internet Explorer | https://login.salesfor |
| 2008-1-24 | 02:00:00 | BSCOTT | IEXPLORE.EXE | 0 | 3600 | Salesforce.com - Windows Internet Explorer | https://login.salesfor |
| 2008-1-24 | 03:00:00 | BSCOTT | IEXPLORE.EXE | 0 | 3600 | Salesforce.com - Windows Internet Explorer | https://login.salesfor |
| 2008-1-24 | 04:00:00 | BSCOTT | IEXPLORE.EXE | 0 | 3600 | Salesforce.com - Windows Internet Explorer | https://login.salesfor |
| 2008-1-24 | 05:00:00 | BSCOTT | IEXPLORE.EXE | 0 | 3600 | Salesforce.com - Windows Internet Explorer | https://login.salesfor |
| 2008-1-24 | 06:00:00 | BSCOTT | IEXPLORE.EXE | 0 | 3600 | Salesforce.com - Windows Internet Explorer | https://login.salesfor |
| 2008-1-24 | 07:00:00 | BSCOTT | IEXPLORE.EXE | 0 | 3116 | Salesforce.com - Windows Internet Explorer | https://login.salesfor |
| 2008-1-24 | 08:00:00 | BSCOTT | IEXPLORE.EXE | 0 | 131 | AA ~ Salesforce - Enterprise Edition - Windows Internet Explorer | https://emea.salesfo |
| 2008-1-24 | 08:51:56 | BSCOTT | OUTLOOK.EXE | 43 | 60 | FW: Kenobi Opening - Message (HTML) | |
| 2008-1-24 | 08:52:57 | BSCOTT | RUNDLL32.EXE | 64 | 16 | A new look for Seamus - Windows Picture and Fax Viewer | A new look for Seam |
| 2008-1-24 | 08:53:13 | BSCOTT | OUTLOOK.EXE | 46 | 28 | RE: Anyone remember this guy? - Message (HTML) | |
| 2008-1-24 | 08:53:42 | BSCOTT | OUTLOOK.EXE | 75 | 4 | Inbox - Microsoft Outlook | |
| 2008-1-24 | 08:53:46 | BSCOTT | IEXPLORE.EXE | 2 | 152 | AA ~ Salesforce - Enterprise Edition - Windows Internet Explorer | https://emea.salesfo |
| 2008-1-24 | 08:56:19 | BSCOTT | IEXPLORE.EXE | 66 | 6 | 2 Reminders - Windows Internet Explorer | |
| 2008-1-24 | 09:00:00 | BSCOTT | IEXPLORE.EXE | 3 | 9 | Search Results ~ Salesforce - Enterprise Edition - Windows Internet Explorer | https://emea.salesfo |
| 2008-1-24 | 09:02:11 | BSCOTT | CALC.EXE | 0 | 2245 | Calculator | |

125a-d

173

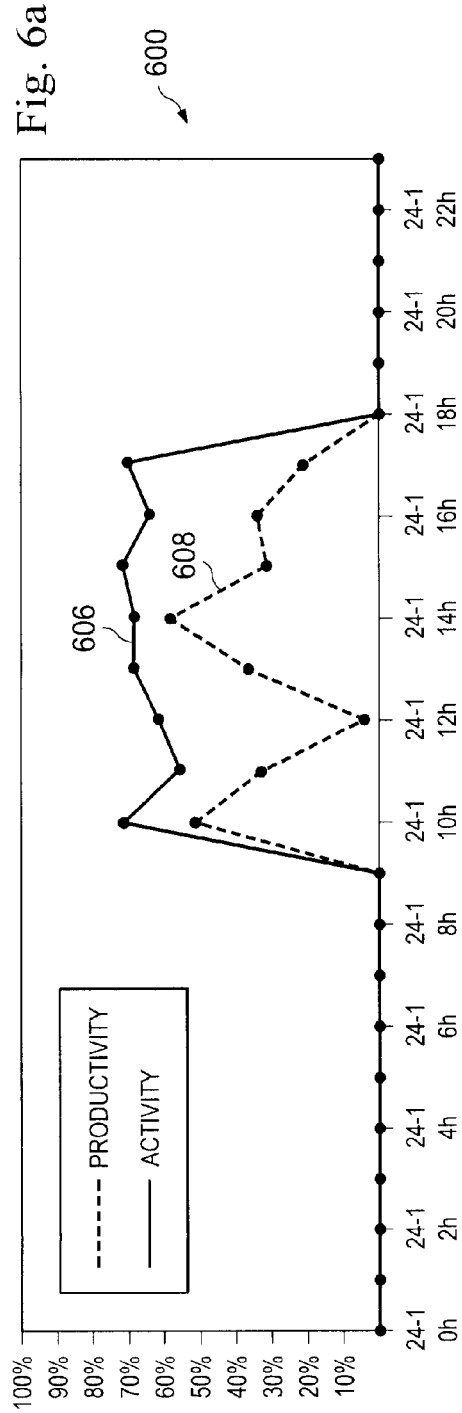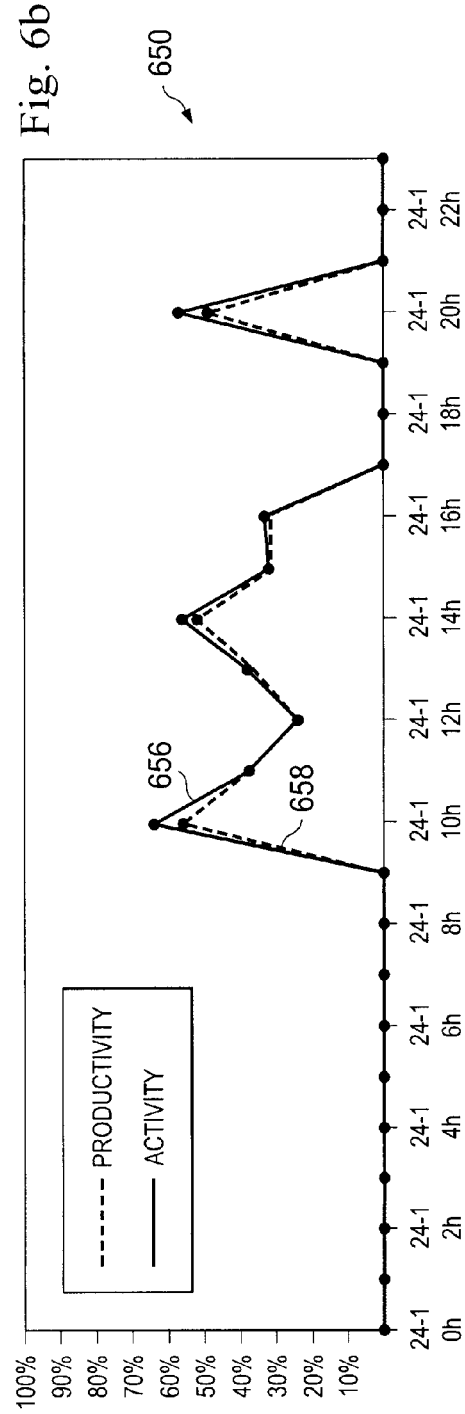

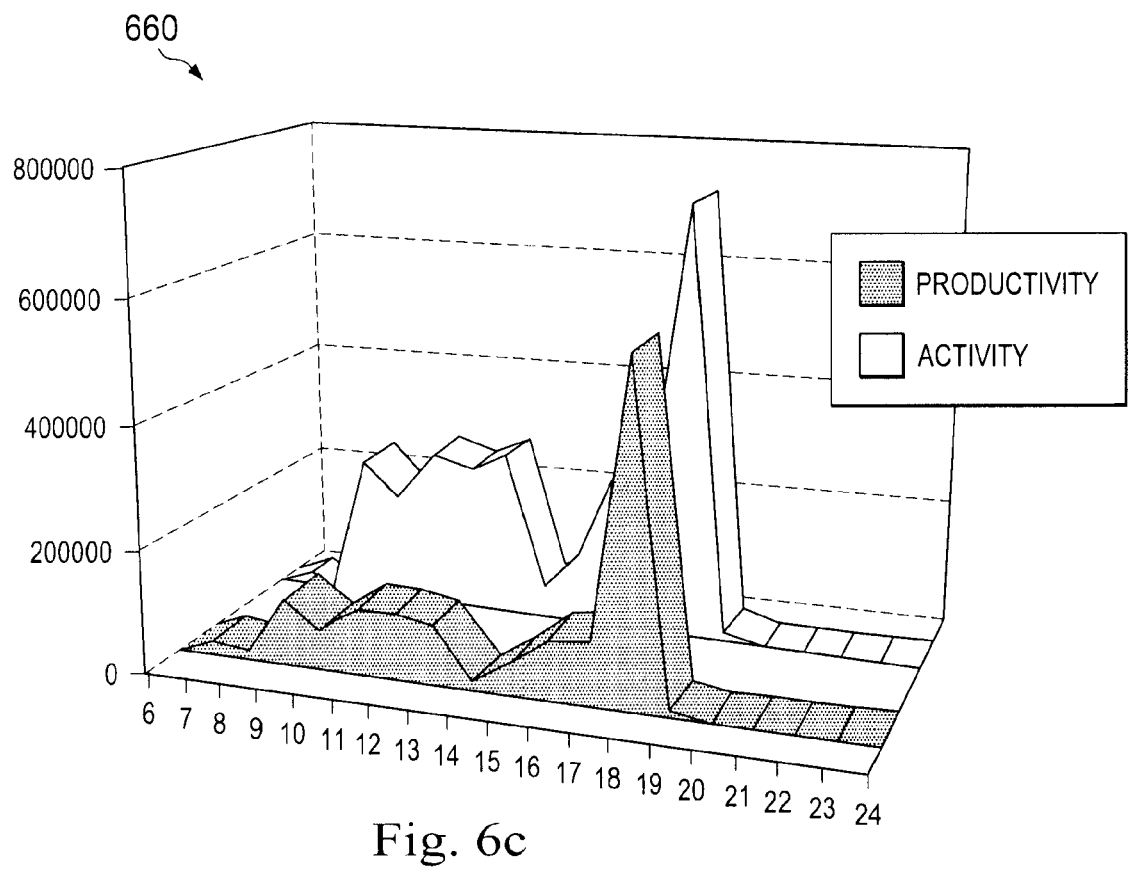

SYSTEM AND METHOD FOR IMPROVING PRODUCTIVITY

CROSS-REFERENCE TO RELATED APPLICATIONS

This application claims the benefit of the filing date of U.S. provisional patent application Ser. No. 61/189,129, filed on Aug. 15, 2008 the disclosures of which are incorporated herein by reference.

BACKGROUND

The present disclosure generally relates to improving productivity, and more specifically, but not exclusively, measuring and understanding an organization member's productivity. In some embodiments, the present disclosure is directed to improved apparatuses, systems, and methods for improving productivity.

Members of an organization may perform many activities while carrying out their responsibilities. Some of those activities are productive for the organization, and other activities are not productive for the organization. For example, in today's workplace, members perform many of their tasks using computers. However, members may use computers for non-productive activities as well as productive activities. Accordingly, in some aspects, the present disclosure relates to evaluating a user's activities on a computer.

Likewise, members perform many of their activities using other forms of communication, such as telephones, personal digital assistants (PDA's), and other mobile devices. However, these other forms of communication may also be used for non-productive activities as well as productive activities. Accordingly, in some aspects, the present disclosure relates to tracking members' use of these other forms of communication.

Conventional apparatuses, systems, and methods for tracking productivity do not provide a complete view of productivity that takes into account the use of various technologies that are used to perform productive and non-productive activities. For example, conventional apparatuses, systems, and methods for tracking productivity do not evaluate data that is available in other systems available within an enterprise computing environment, such as an organization's telephone systems, customer relationship management (CRM) systems, global positioning systems (GPS) systems, and radio-frequency identification (RFID) systems. Accordingly, in some aspects, the present disclosure relates to using data available in other enterprise systems to evaluate productivity.

Traditional apparatuses, systems, and methods for tracking member productivity are not satisfactory in all respects. Therefore, there remains a need for improved apparatuses, systems, and methods for improving productivity.

SUMMARY

In an embodiment, a method of the present disclosure includes collecting user activity data from a client device. The method also includes defining an activity-productivity map that defines a rule for determining a unit of productivity based on the activity data. A productivity metric may be determined using the user activity data and the rule for determining the unit of productivity. Upon determining the productivity metric, a visual representation of the productivity metric may be provided.

In another embodiment, the present disclosure provides a system that includes a client device configured to maintain a record of user activities performed on the client device. The system also includes a server that is communicably coupled to the client device, wherein the server is configured to maintain an activity-productivity map that defines a rule for determining a unit of productivity based on the activity data, and determine a productivity metric using the record of user activities and the rule for determining the unit of productivity.

In yet another embodiment, the present disclosure provides a computer having a computer-readable medium, and a processor configured to execute instructions stored on the computer-readable medium. The instructions stored on the computer-readable medium include instructions for collecting user activity data from a client device, and instructions for defining an activity-productivity map that defines a rule for determining a unit of productivity based on the activity data. The instructions stored on the computer-readable medium include instructions for determining a productivity metric using the user activity data and the rule for determining the unit of productivity, and instructions for providing a visual representation of the productivity metric.

These and other aspects and advantages of the present disclosure will become apparent to those skilled in the art from the detailed description of the embodiments set forth below.

BRIEF DESCRIPTION OF THE DRAWINGS

FIG. 1b is an embodiment of an activity data file that embodies aspects of the present disclosure.

FIG. 6a is a chart that embodies aspects of the present disclosure.

FIG. 6b is a chart that embodies aspects of the present disclosure.

FIG. 6c is a chart that embodies aspects of the present disclosure.

FIG. 6d is a chart that embodies aspects of the present disclosure.

DETAILED DESCRIPTION

Figure 1A:
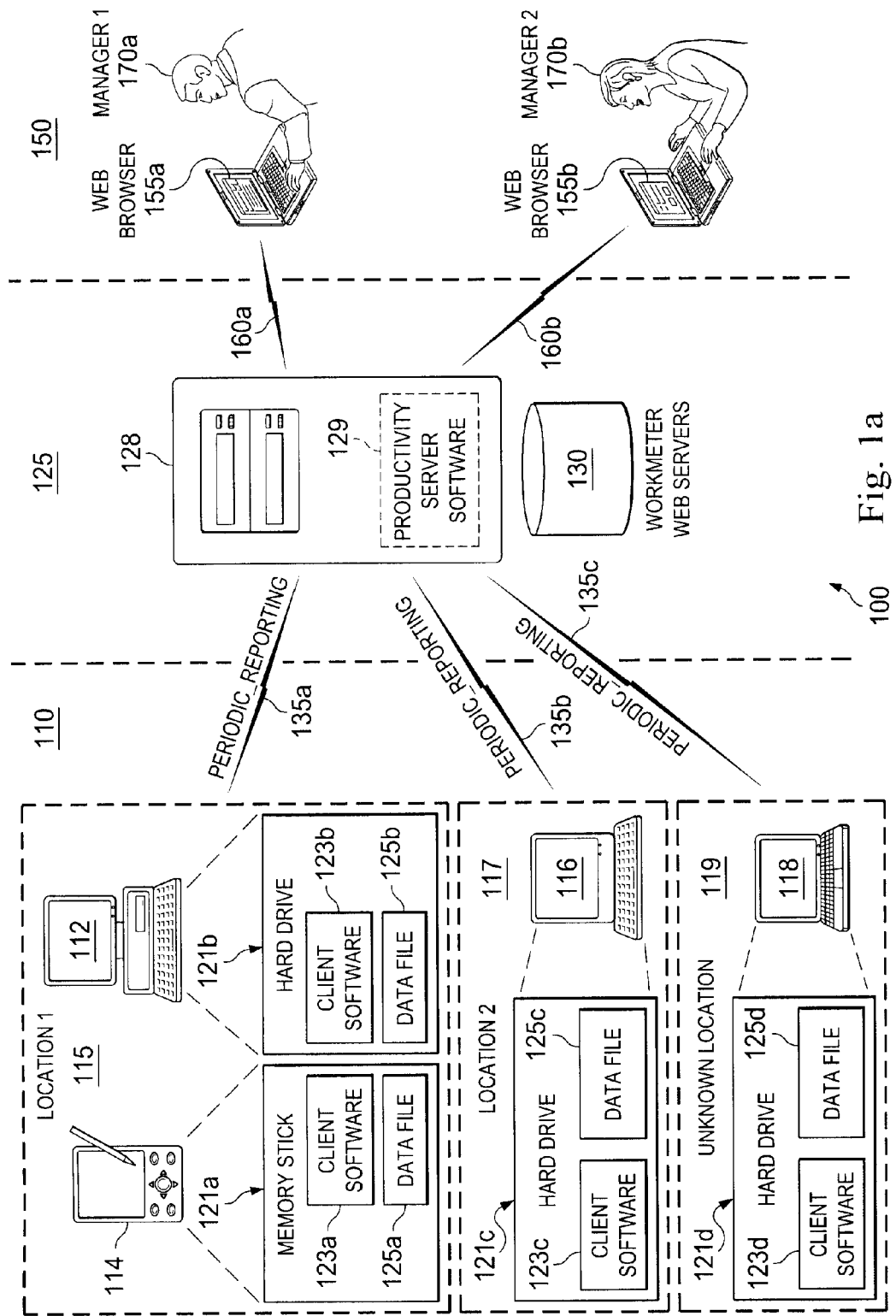
FIG. 1a is a schematic view of a system that embodies aspects of the present disclosure.

For the purposes of promoting an understanding of the principles of the present disclosure, reference will now be made to the embodiments illustrated in the drawings and specific language will be used to describe these embodiments. It is nevertheless understood that no limitation of the scope of the disclosure is thereby intended. Modification of the disclosed embodiments and/or further application of the principles of the present disclosure are fully contemplated as would occur to one skilled in the art to which the present disclosure relates.

Referring now to FIG. 1, shown therein is a schematic view of a system 100 that embodies aspects of the present disclosure. The system 100 is divided into three groups. The first group includes client devices 110. Client devices 110 include a desktop computer 112 and a mobile device 114 at a first location 115. A terminal 116 is located at a second location 117. Finally, a laptop computer 118 is located at a third location 119. The first, second, and third locations 115, 117, and 119 may be in proximately the same physical location or they may be geographically spread out at various locations. The client devices 110 shown in FIG. 1 are merely representative and it should be understood that other devices may be used as client devices 110. For example, client devices 110 may also include PDAs, mobile phones, and other devices that include memory and a processor configured to execute instructions on the memory.

Each of the client devices 110 includes a computer-readable medium 121a-d adapted to store instructions that may be executed by a processor of the client device 110. The computer-readable medium 121a-d is any conventional computer-readable medium known in the art, including hard drives, memory sticks, etc. The instructions include instructions that implement client software 123a-d that is configured to implement methods that are described in more detail below. The computer readable medium 121a-d also includes an activity data file 125a-d.

The client devices 110 may be used by one or more users. The users may be, for example, employees of a corporation. In another embodiment, the users may be family members, such as children, that are using the client device. In another embodiment, users may be members of any non-corporate entity, such as a volunteer organization.

The second group includes server system 125. The server system 125 includes a web server 128 that is communicably coupled to a database 130. The web server 128 is a conventional web server 128 that uses a conventional web server 128 operating system, such as the Microsoft Windows Server 2000 operating system. Furthermore, productivity server software 129 is deployed on the web server 128. The productivity server software 129 is described in more detail below.

The database 130 is implemented using a conventional database platform, such as the Microsoft SQL Server 2000 database platform. According to other embodiments of the present disclosure, other operating systems and database platforms may be used, including without limitation, UNIX or Linux-based software.

Each of the client devices 110 are communicably coupled to the server system 125 via network connections 135a-c. Network connections 135a-c may be persistent network connections (also known as "always-on" network connections) or on-demand network connections, as known in the art.

The third group includes management interfaces 150. Management interfaces 150 include conventional web browsers 155a-b that are configured to interface with the web server 128 over network connections 160a-b. Managers 170a-b use the web browsers 155a-b to view data provided by the web server 128. In an embodiment, managers 170a-b use the management interfaces 150 to view activity and productivity data provided by the web server 128. The management interfaces 150 also enable managers 170a-b to manage the deployment of client software 123a-d on various client devices 110, and configure various aspects of embodiments of the present disclosure.

The managers 170a-b may be supervisors of users that use the client devices 110. However, in other embodiments, the managers 170a-b may be anybody that wants to view the activity and productivity data provided by the web server 128. For example, in an embodiment, a user of a client device 110 may be interested in viewing his/her productivity information, and may be provided with access to the management interfaces 150. In another embodiment, the managers 170a-b are members of a family, such as the parents of the user of a client device 110. In yet another embodiment, managers 170a-b are non-corporate individuals, such as directors of a volunteer organization.

Referring now to FIG. 1b, shown therein is an embodiment of an activity data file 125a-d. In an embodiment, activity data files 125a-d are stored in the form of a Microsoft Excel spreadsheet. The activity data file 125a-d includes the following fields: date, time, username, application name, activity, duration, window title field 172, and secondary window data field 173. The activity data file 125a-d shown in FIG. 1b is a simplified embodiment of a data file 125a-d, and it should be understood that a data file 125a-d can include more or less data fields than those shown in FIG. 1b.

The user activity information may be expressed as a percentage of time that a user performs activities with the window. For example, the percentage may be determined using the following formula: $(((T1 \text{ with activity})*100)/(T1 \text{ with activity})+(T1 \text{ without activity})))$. In other embodiments, the activity information may be calculated differently.

The activity data file 125a-d may also be adapted to store secondary window data in field 173. For example, if the user activity includes use of a web browser application, then the uniform resource locator (URL) accessed by the browser window is stored in the activity data file 125a-d. In another embodiment, if the user interaction includes use of a word processing document, then the active document name is stored in the activity data file 125a-d.

Figure 1C:
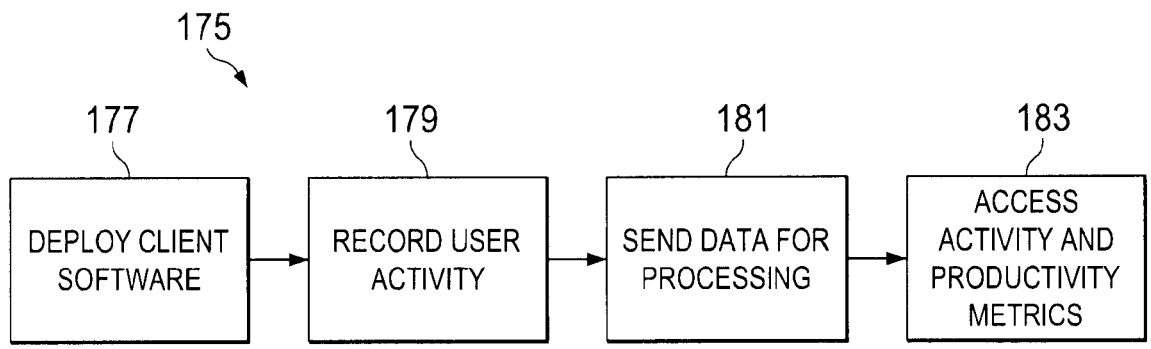
FIG. 1c is a flowchart of a method for operating a system that embodies aspects of the present disclosure.

An exemplary method 175 for operating the system 100 is shown in FIG. 1c. The method 175 includes deploying client software 123a-d on each of the client devices 110 at block 177. The client software 123a-d is configured to store data related to a user's activities when using the client device 110 at block 179. For example, the client software 123a-d may record data related to the usage of applications deployed on the client devices 110. Application usage data is then sent to server system 125 for centralized storage and processing at block 181. The server system 125 processes the user activity data, and determines activity and productivity metrics based on the user activity data. Managers 170a-b may then use the web browsers 155a-b to access the activity and productivity metrics as presented by the web server 128 in various forms at block 183.

Figure 1D:
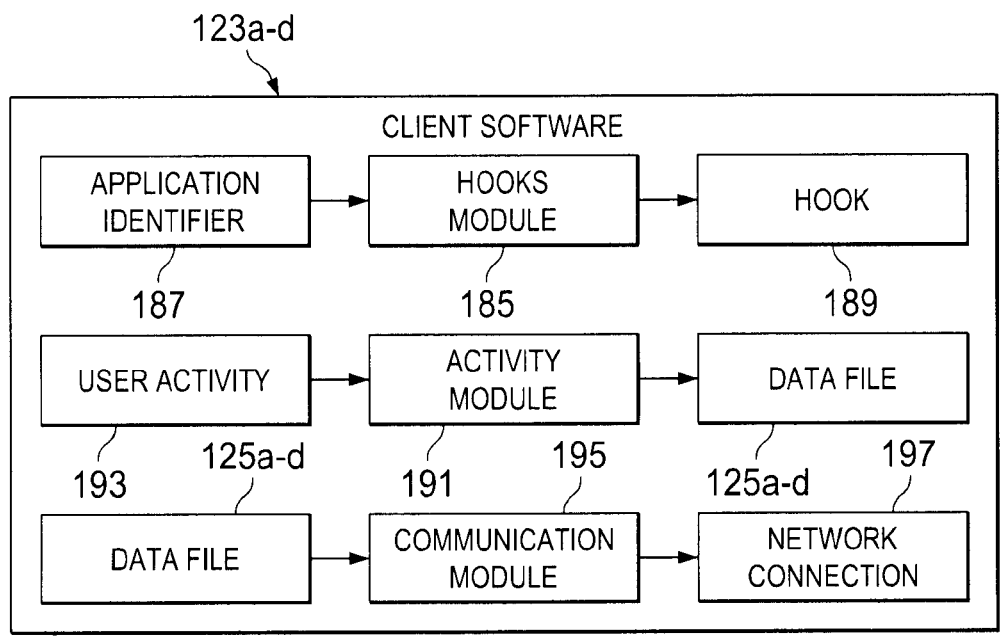
FIG. 1d is a schematic view of client software that embodies aspects of the present disclosure.

An exemplary embodiment of the client software 123a-d is shown in FIG. 1d. The client software 123a-d includes a hooks module 185. The hooks module 185 receives an input of an application identifier 187 that represents an application deployed on the client device 110, and instantiates a hook 189 that monitors an application that is identified by the application identifier. A "hook" is a process that is configured to monitor operating system events. Hooks are also sometimes referred to as "interrupts."

In an exemplary scenario, the client software 123*a-d* may instantiate an application hook 189 with respect to a website browser application to detect every time a user opens a new browser window. This is just one example of a hook 189 that may be used to monitor user input. Other hooks 189 for monitoring user activity with respect to other applications deployed on a client device 110 are also within the scope of the present disclosure.

The client software 123*a-d* also includes an activity module 191. The activity module 191 receives input of user activity 193, and outputs the user activity to an activity data file 125*a-d*. For example, when a user navigates to a new URL, the activity module 191 records the navigation to a new URL as a user activity 193, and records the user activity 193 to the activity data file 125*a-d*.

The client software 123*a-d* also includes a communication module 195. The communication module 195 receives input of an activity data file 125*a-d*, and outputs a network connection 197 that communicably couples the client device 110 to the web server 128. Once the network connection 197 is established, the communication module 195 also facilitates sending the activity data file 125*a-d* to the web server 128.

The communication module 195 of the client software 123*a-d* is configured to send the activity data file 125*a-d* to the web server 128 for processing at periodic intervals. In an embodiment, the intervals may be a predetermined time every day (e.g., at noon every day). In another embodiment, the interval may depend on network connectivity. For example, a client device 110 may be a mobile device that has intermittent Internet connectivity. In such devices, the client software 123*a-d* may be configured to send the activity data file 125*a-d* to the web server 128 whenever a network connection can be established with the web server 128. In yet another embodiment, the interval for sending an activity data file 125*a-d* to the server is determined by how much activity has occurred on the client device 110. For example, during periods of increased activity, activity data file 125*a-d* may be sent to the web server 128 more frequently than during periods of decreased activity.

The client software 123*a-d* executes in a process of the operating system of the client device 110. In an embodiment, the client software 123*a-d* runs as a hidden process, and is adapted to restart upon any intentional or non-intentional (e.g. termination of a process due to an operating system error) termination. Further, the client software 123*a-d* may be configured to include anti-tamper mechanisms to prevent a user of the client device 110 from modifying the activity data file 125*a-d*. Anti-tamper mechanisms may also include processes for detecting unauthorized modifications to activity data.

Embodiments of the present disclosure can provide valuable activity and productivity data to managers 170*a-b* and users of client devices 110. Embodiments of the present disclosure may be used to measure individual and/or group activity and productivity using objective data that is collected and maintained using a scalable centralized model.

Figure 2:
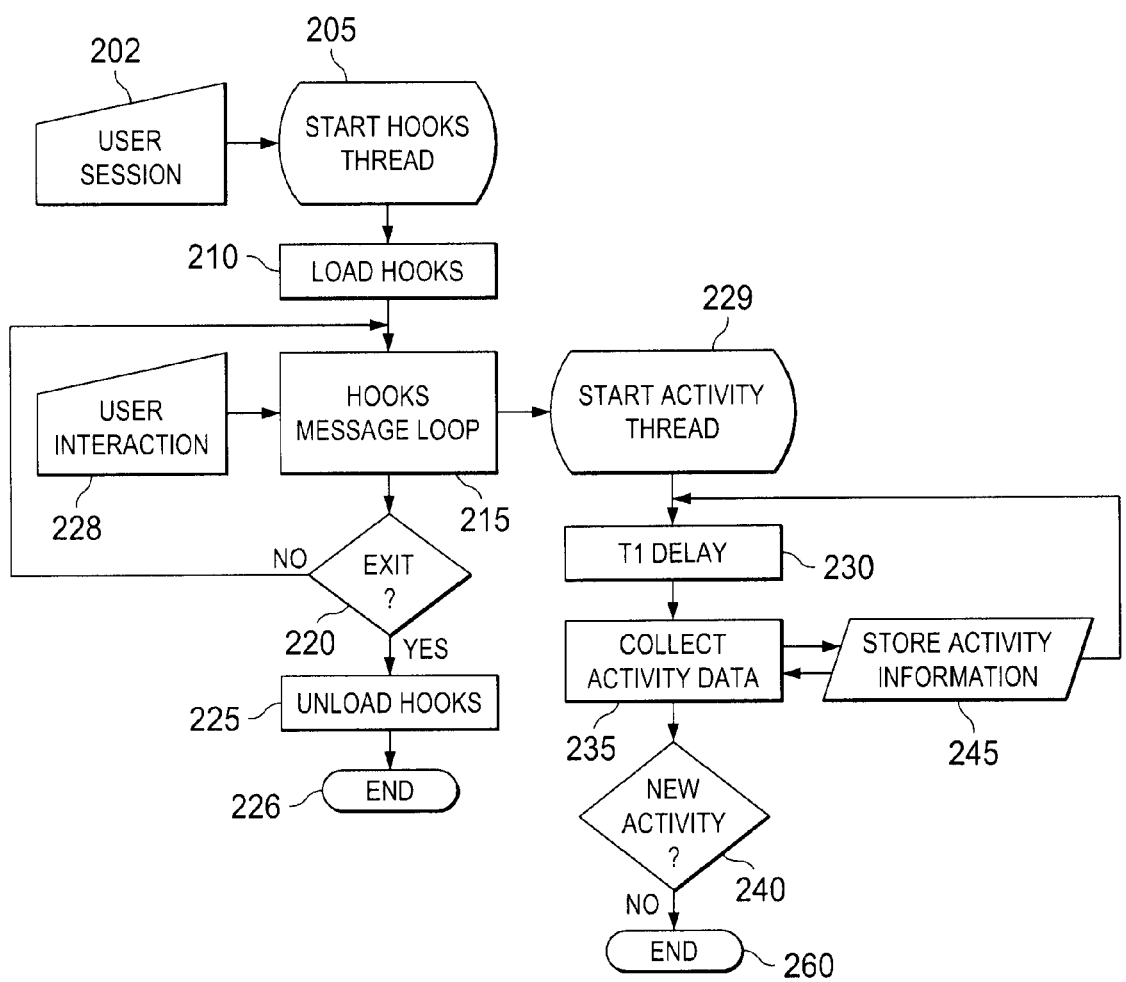
FIG. 2 is a flowchart of a method that is implemented by client software that embodies aspects of the present disclosure.

Referring now to FIG. 2*a*, shown therein is a flowchart of a method 200 that is implemented by the client software 123*a-d*. Generally, the method 200 collects activity data related to usage of applications deployed on a client device 110. The method begins at a block 202 upon the start of a user session. For example, the method 200 arrives at block 202 when a user logs into an operating system account. The method 200 proceeds to block 205, where a plurality of hook threads are started. The hook threads monitor one of more applications executing on the client device 110 at block 210, and loops at a block 215 until it is determined at block 220 that the hook threads are terminated. When the hook thread terminates, the method 200 proceeds to block 225, where all hooks are unloaded from the application, and the method 200 ends at block 226. In another embodiment, one or more hook threads are terminated while the remaining hook threads continue to monitor applications.

If user activity occurs while the method 200 is at block 215 (e.g., a user opens a new web browser window), then an activity thread is initialized at block 229. The method continues to block 230, where a timer begins to measure a period of time T1. During the period T1, the activity thread collects user activity data at block 235. User activity data is stored as an activity data file 125*a-d* at block 245. The blocks 230, 235, and 245 may repeat any number of times during the period T1. When a user begins a new activity (e.g., the user launches an application), the method 200 determines at block 240 that a new activity has begun, and loops back to block 229, where the first activity thread terminates, and a second activity thread begins. In other embodiments, the first activity thread merely rests (i.e., stops recording activity information) while the second activity thread is activated. It is also possible for multiple activity threads to execute concurrently. During periods of inactivity, an activity thread may terminate at block 260 (e.g., no activity is detected for a predetermined number of minutes).

In a windows-based operating system, such as Microsoft Windows, the user activity data that is stored at block 245 includes data about the active window. The active window data may be saved in the activity data file 125*a-d*.

Figure 3:
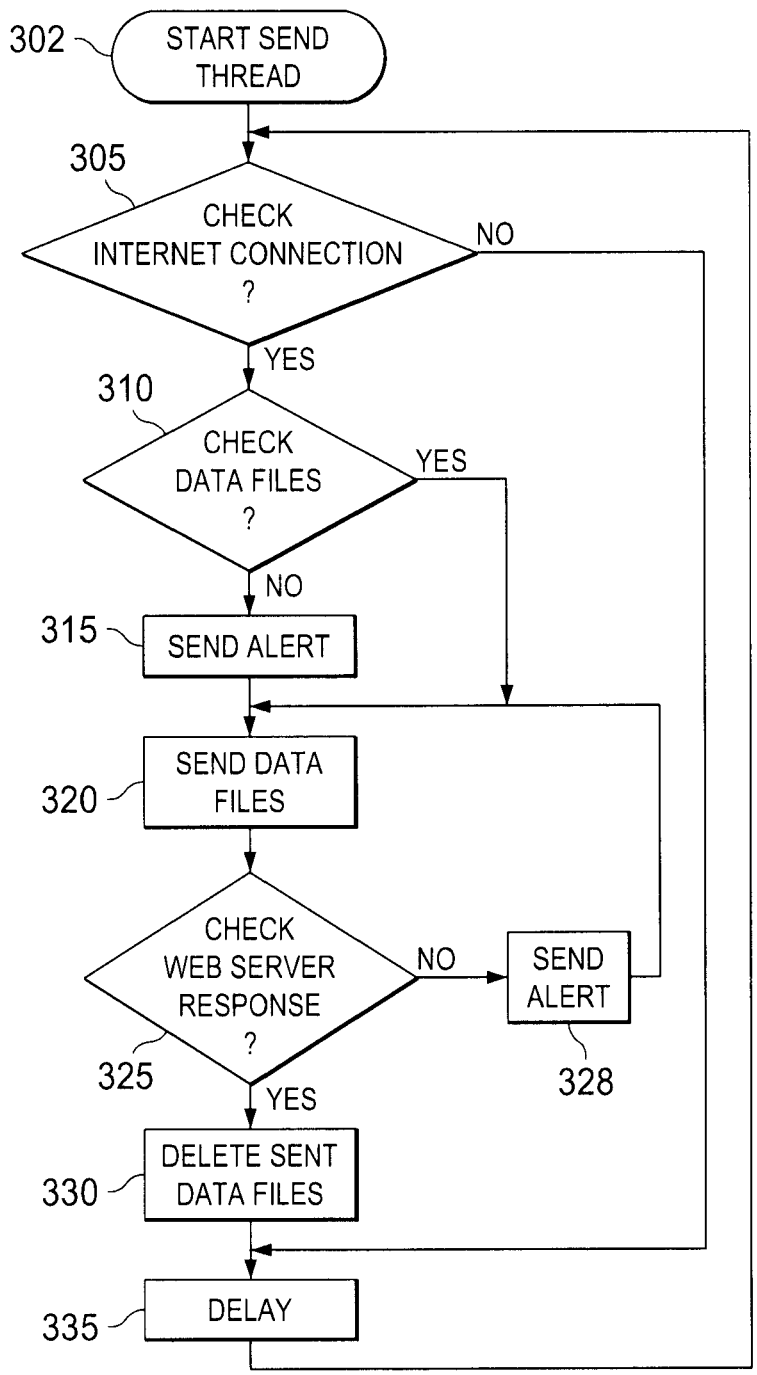
FIG. 3 is a flowchart of a method that is implemented by client software that embodies aspects of the present disclosure.

Referring now to FIG. 3, shown therein is a flowchart of a method 300 that is implemented by the client software 123*a-d*. Generally, the method 300 is a method for sending activity data files 125*a-d* from a client device 110 to the web server 128. The method 300 begins at block 302, where the send thread is initialized. At block 305, a network interface of the client device 110 is evaluated to determine whether there is an active Internet connection.

If there is an active Internet connection, the method 300 proceeds to block 310, where the integrity of the activity data file 125*a-d* is examined to determine whether the activity data file 125*a-d* is corrupt, or has been modified without authorization. The integrity of the activity data file 125*a-d* may be examined using any conventional method known. For example, a checksum calculated from the activity data file 125*a-d* may be compared to a stored checksum. If the two checksums are the same, then it is determined that the integrity of the activity data file 125*a-d* has been maintained. However, if it is determined that the activity data file 125*a-d* is corrupt (e.g., the two checksums are different), or has been tampered with, then the method 300 sends a message to the web server 128. The message may include data that informs the managers 170*a-b* that there may be an issue with the activity data file 125*a-d*.

From blocks 310 and 315, the method 300 proceeds to block 320. At block 320, the activity data file 125*a-d* is sent to the web server 128. The activity data file 125*a-d* can be sent to the web server 128 using any technology known in the art, including via HTTP communication with a web service interface provided by the web server 128. At block 325, the client software 123*a-d* queries the web server 128 to determine if the activity data file 125*a-d* has been received. If the web server 128 indicates that the activity data file 125*a-d* has not been received, then the client software 123*a-d* sends a message to the web server 128. The message may include data that will inform the web server 128 that an attempt to send the activity data file 125*a-d* has failed. Upon sending the message to the web server 128, the method proceeds to block 320, whereupon the client software 123*a-d* retries sending the activity data file 125*a-d*.

If the web server 128 indicates that the activity data file 125*a-d* has been received, then the client software 123*a-d* may delete the activity data file 125*a-d* that has been sent. Alternatively, the activity data file 125*a-d* is archived on the client device 110. At step 335, the method 300 waits a specified period of time before repeating block 305.

Figure 4A:
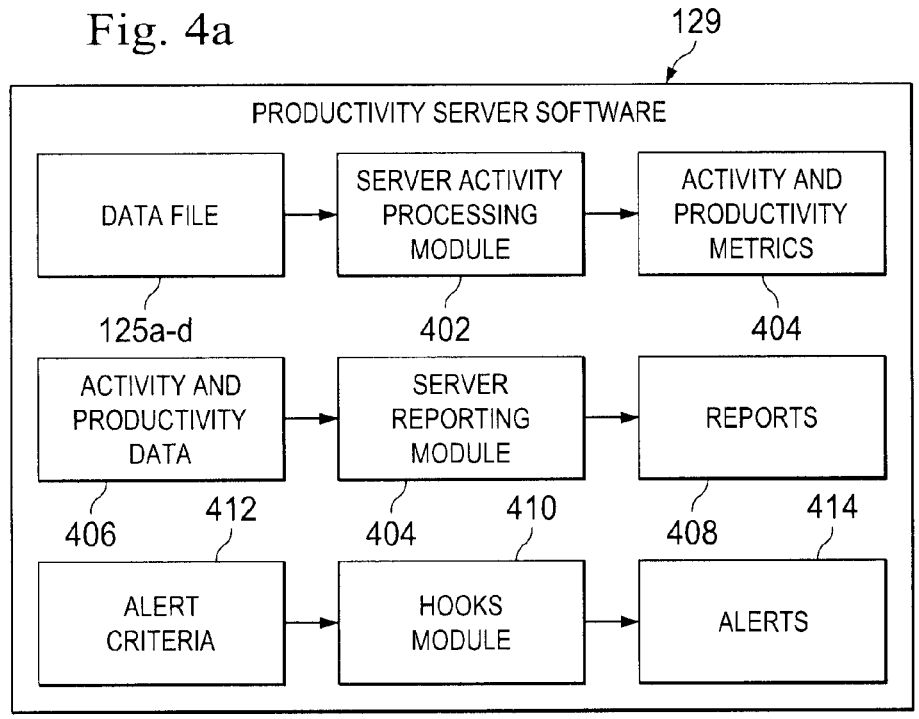
FIG. 4a is a schematic view of productivity server software that embodies aspects of the present disclosure.

Referring now to FIG. 4*a*, shown therein is a schematic view of the productivity server software 129. The productivity server software 129 includes a server activity processing module 402 receives a data file 125*a-c* as input, and outputs activity and productivity metrics 404. The productivity server software 129 also includes a server manager reporting module 404 that receives input that includes activity and productivity data 406, and outputs a plurality of reports 408. In addition, the productivity server software 129 also includes a server alerts module 410 that receives alert criteria 412 as input, and outputs alerts 414.

Alerts 414 are processes that run on the web server 128, analyze the activity and productivity information, and determine whether further action, such as notification, is required. In an embodiment, the alerts 414 execute on a separate server that is communicably coupled to the web server 128 and the database 130 in order to distribute processing load. Alerts 414 are described in more detail below.

Figure 4B:
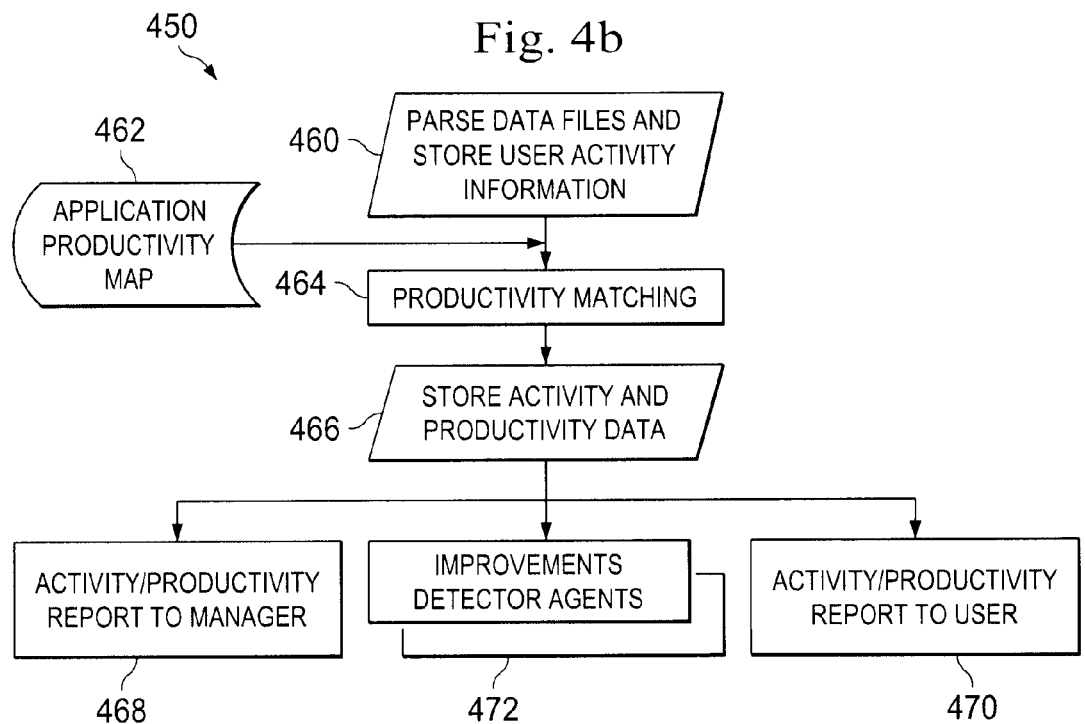
FIG. 4b is a flowchart of a method that is implemented by a server activity processing module that embodies aspects of the present disclosure.

Referring now to FIG. 4*b*, shown therein is a flowchart of a method 450 that is implemented by the server activity processing module 402 of the productivity server software 129. At block 460, the data is extracted from the activity data files 125*a-d* received from a client device 110, and is stored in the database 130. In an embodiment, a record relating to the user activity information contains every field defined in the activity data files 125*a-d*. For example, the record may include at least the following fields: user login, computer name, timestamp, duration, process information (e.g., module name, product version, active window title, active child window title, field description, organization name, product name, full executable path), and user activity information.

Proceeding to block 462, an activity-productivity map is loaded from the database 130 into a memory of the web server 128. The activity-productivity map includes data related to one or more applications installed on the client devices 110, and may indicate productivity rules that may be used to determine whether certain activity should be considered productive.

The web server 128 may include multiple activity-productivity maps. Each activity-productivity map may be applicable to a subset of users, profiles, or roles defined within an organization. It should be understood that an organization may be any group of people, including without limitation a corporate entity, a family entity, or any other non-corporate entity. In an embodiment, the activity-productivity map may define an activity, such as usage of a web browser application, by a first group of members to be productive if the URL being visited is the URL of an application service provider, such as salesforce.com, for example. On the other hand, a second group's usage of the web browser application to visit the same application service provider website may be considered non-productive. Likewise, use of the web browser application by any user to view a social networking website, such as facebook.com, may be defined as non-productive. It should be appreciated that there are an unlimited number of configurations for an activity-productivity map.

When an application executes on a client device 110, the application runs in a window that is usually titled. For example, as seen in the window title field 172 of the activity data file 125*a-d* shown in FIG. 1*b*, a calculator application runs in a window that is titled "Calculator." Accordingly, an activity-productivity map may include rules that are based on window titles.

In some applications, an application title is not enough to distinguish between multiple executing instances of the application. For example, multiple executing instances of an application may execute in windows that have the same title. Such applications may offer other information that may be used to differentiate the various executing instances. For example, a document filename can be used to distinguish between multiple executing instances of a word processing application. In another example, the active URL in a web browser may be used to distinguish between multiple executing instances of a web browser. Secondary window data field 173 of the activity data file 125*a-d* shown in FIG. 1*b* shows an example of active URL data that may be used to distinguish between multiple executing instances of a web browser application that is deployed on a client device 110. Accordingly, an activity-productivity map may include rules that are based on a filename or a URL that is active with respect to a word processing document or a web browser, respectively.

Productivity matching occurs at block 464. Productivity matching includes calculating productivity metrics based on the user activity information included in the activity data files 125*a-d* and the productivity classifications defined in the activity-activity-productivity map. Embodiments of productivity matching are described in more detail below with respect to FIG. 5. Activity and productivity metrics are stored in the database 130 at block 466.

The activity and productivity metrics stored in the database 130 are provided to other modules of the productivity server software 129. For example, the activity and productivity information may be provided to the server reporting module 404 at blocks 468 and 470 in order to provide reports 408 to the managers 170*a-b* and users of the client devices 110. The activity and productivity metrics are also provided to the server alerts module 410 at block 468 in order to produce the alerts 414.

Figure 5:
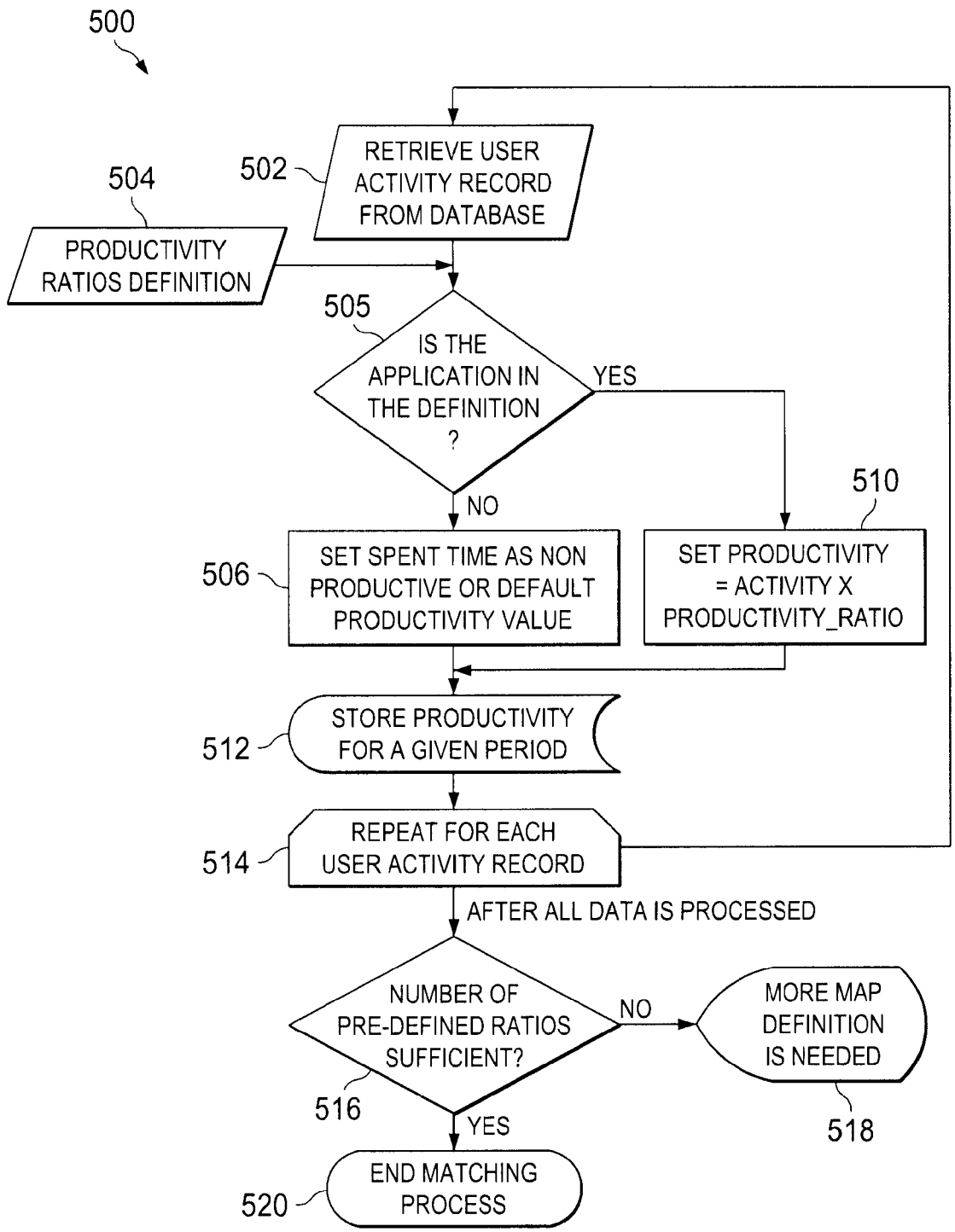
FIG. 5 is a flowchart that is implemented by a server activity processing module that embodies aspects of the present disclosure.

Referring now to FIG. 5, shown therein is a flowchart of a method 500 that is implemented by the server activity processing module 402 of the productivity server software 129 operating on the web server 128. The method 500 is an exemplary embodiment of a method for performing the productivity matching that occurs at block 424 shown in FIG. 4. The method 500 begins at block 502, where a user activity record is retrieved from the database 130.

Productivity ratio definitions are retrieved from the database 130 at block 504. Productivity ratio definitions are predefined ratios that indicate how much of a user's activity, with respect to an application, should be considered productive. In an embodiment, productivity ratios may be defined by managers 170*a-b* based on the average productivity of other members. Alternatively, a member's past productivity data may be used to define productivity ratios.

As an example, a manager 170*a-b* may define a productivity ratio for the application of 0.80. A productivity ratio of 0.80 indicates that only 80% of the user's activity with respect to the word processing application should be considered productive. Although user activity information may indicate that a user has spent one hour using an application, only 48 minutes of the user's activity is considered to be productive activity (i.e., 60 minutes×0.80=48 minutes), and the remaining 12 minutes is defined as "unproductive" activity. In other embodiments, productivity ratios may be any number from 0 to 1.0. In another embodiment, the productivity ratio is greater than 1.0. In yet another embodiment, a productivity ratio may be a negative.

At block 505, the server activity processing module 402 evaluates the user activity record to determine whether a productivity ratio exists for the application used in the user activity data. For example, if the user activity record relates to user activity within a word processing application, the server activity processing module 402 determines whether a productivity ratio has been defined for the word processing application. This determination may be based on the application window data (e.g., the title of the application window).

If no productivity ratio has been defined for the application, then the method 500 proceeds to block 506. At block 506, the amount of activity time recorded in the user activity information is classified as non-productive time. In another embodiment, a default productivity ratio is predefined. For example, if a default productivity ratio of 0.20 is defined, then at block 506, 20% of the amount of activity time recorded in the user activity information is classified as general productive time that is not correlated with a specific program, and the remaining 80% of the amount of activity time recorded in the user activity information is classified as non-productive time.

If a productivity ratio has been defined for the application that was used in the user activity information, then at block 510, a user's productivity information for the period of time recorded in the record being evaluated is calculated using the following formula: productivity=activity time×productivity ratio. The user activity record is updated to include the calculated productivity information at block 512.

The method 500 loops back to block 502, and a second user activity record is retrieved from the database 130. Blocks 502, 504-506, 510, 512, and 514 are repeated for the second user activity record. Once all user activity records have been processed in the loop, the method 500 continues to block 516.

It should be understood that productivity metrics are based on activity metrics derived from the activity information. The quality of productivity metrics may be dependent on the amount of activity information collected by the client software 123*a*-*d* and the definition of activity-productivity maps. For example, if not enough activity information is collected by the client software 123*a*-*d*, it may be difficult to produce accurate productivity metrics. Likewise, if the activity-productivity maps do not identify enough applications that could be executed on a client device 110, then it will be difficult to match the rules defined in the activity-productivity map with the activity information (i.e., such circumstances may produce low match success ratios).

At block 516, the server activity processing module 402 determines whether the number of predefined productivity ratios is sufficient. The server activity processing module 402 determines this by determining the percentage of user activity records that were related to an application that has a corresponding predefined productivity ratio. If the match success ratio is less than the desired match success ratio, then the method 500 proceeds to block 518, and sends a message to the managers 170*a*-*b*, to inform them that more map definitions are requested. However, if the match success ratio is better than the desired match success ratio, then the method 500 proceeds to block 520, where the method 500 ends.

In an exemplary embodiment, at block 505, each time the server activity processing module 402 determines that a user activity record relates to an application that has a corresponding predefined productivity ratio, a counter is increased. The server activity processing module 402 compares the counter to the total number of user activity records that were evaluated to determine a match success ratio. Generally, a higher match success ratio correlates to more informative productivity data. The match success ratio is then compared at block 516 to a desired match success ratio to determine whether more productivity ratios should be defined, or if the existing productivity ratios should be refined.

In an exemplary scenario, a predefined productivity ratio exists for two applications, and ten user activity records are evaluated. Out of those ten user activity records, only five of those records were related to usage of the two applications for which a predefined productivity ratio exists. Thus, the match success ratio for the set of evaluated records is 50%. If, for example, the desired match success ratio is 60%, then more productivity ratios should be defined, so that the match success ratio can be increased.

Referring back to FIG. 4*a*, the activity and productivity information is provided to the server reporting module at block 428. The server manager reporting module 404 uses the activity and productivity information to create various reports 408. These reports are presented to managers 170*a*-*b* and users so that they can evaluate the productivity of a user of a client device 110.

The reports 408 are made available in a variety of forms, including without limitation statistics, dashboards, charts, and graphics. These reports 408 may present information in two dimensions or three dimensions. Both managers 170*a*-*b* and users can use these various reports 408 to understand the activity and productivity metrics to improve productivity within an organization.

Referring now to FIG. 6*a*, shown therein is an embodiment of a chart 600. The chart 600 is a report 408 that compares productivity data to activity data. The x-axis 602 represents time throughout the course of a work day, and the y-axis 604 represents a unit of productivity or activity. Units of productivity or activity may represent a unit of time (e.g., seconds, minutes, hours, days, months, years, etc.), or any other unit of measurement. The broken line 606 represents an activity metric. The unbroken line 608 represents a productivity metric. In another embodiment, the chart 600 represents the activity and productivity of more than one user. That is, the activity and productivity data of a group of users can be aggregated for presentation on the chart 600.

Gaps between the activity line 606 and the productivity line 608 may represent periods where a user's productivity may be improved. For example, such gaps may indicate that the user is using the client device 110 for non-productive activities. However, such gaps could also indicate that the activity-productivity maps used in the productivity matching process can be improved. That is, such gaps may be evidence that the productivity ratio definitions are insufficient to provide effective productivity matching.

Referring now to FIG. 6*b*, chart 650 is another embodiment of a report 408 in the form of a chart 650 that compares activity to productivity. In the chart 650, there is a closer correlation between the activity and the productivity lines 656, 658 respectively. The closer correlation between the activity and productivity lines 656, 658 suggest that the user (s) of the client device 110 are more productive than the user(s) of the client device 110 shown in the previous chart 600, because the gaps between the activity and productivity lines 656, 658 is smaller.

Managers 170*a*-*b* and users of client devices 110 may focus on increasing the correlation between a user's activity and productivity metrics. Large gaps between an activity line and a productivity line shown in a report 408, such as charts 600 and 650, may represent times throughout a working period where a user's productivity could be improved so that the user's activity is directed towards activities that are considered productive.

Reports 408 may include various other charts that are created using the activity and productivity data. FIG. 6c shows an embodiment of a report 408 in the form of a chart 660 that compares productivity data to activity data in a three-dimensional format.

Individual and group metrics can be used to provide rankings to members of an organization. For example, a report that ranks the most productive members and/or groups within an organization may be provided to educate and motivate members of an organization. FIG. 6d shows an embodiment of a report 408 in the form of a chart 670 that shows the top five most productive users in an organization. FIG. 6d also shows an embodiment of a report 408 in the form of a chart 680 that shows the bottom five least productive users in an organization.

Figure 6E:
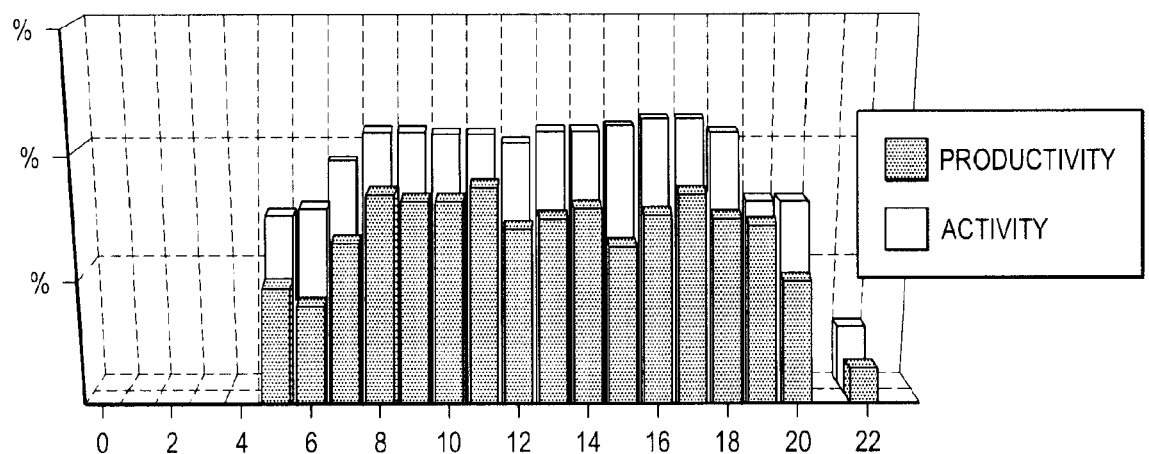
FIG. 6e is a chart that embodies aspects of the present disclosure.

FIG. 6e shows an embodiment of a report 408 in the form of a three-dimensional chart that compares the activity and productivity data of a team of users.

Figure 6F:
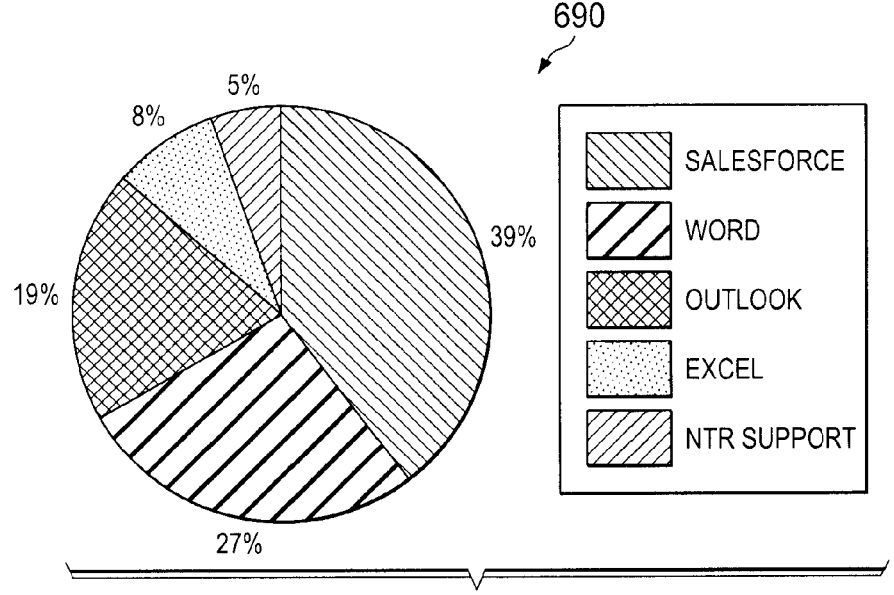
FIG. 6f is a chart that embodies aspects of the present disclosure.

FIG. 6f is a report 408 in the form of a pie-chart 690 that shows the top applications that have been used the most for productive activity.

Various other statistics related to activity and productivity may also be presented to managers 170a-b and users. For example average daily activity, average activity start hour, and average activity end hour are all metrics that may be useful when evaluating productivity.

Users of client devices 110 may use the activity and productivity data contained in various reports 408 to improve their productivity. In some cases, users may not be aware of how their productivity fluctuates throughout a work period. Active monitoring of activity and productivity can help a member of an organization modify their routines to focus their activities toward productivity goals that benefit the user and the organization.

To assist users of client devices 110 with attaining and maintaining productivity goals, one or more alerts 414 may be implemented. Referring again to FIGS. 4a-b, the activity and productivity metrics are provided to the server alerts module 410 at block 430. The server alerts module 410 uses the activity and productivity information to enable one or more alerts 414.

An alert 414 may be defined with respect to individual members or groups of members. Furthermore, alerts 414 may be defined with respect to negative thresholds as well as positive thresholds. For example, an embodiment of an alert 414 may notify a user and/or his managers 170a-b if the user has a low amount of activity or productivity over a course of time. Likewise, in another embodiment, an alert 414 may notify a user and/or his managers 170a-b if the user's activity or productivity data indicates that the user has exceeded a certain threshold. High levels of activity or productivity may be evidence of a need to redistribute workloads.

Alerts 414 may include any form of communication. For example, the alerts 414 may be sent to managers 170a-b and users using email, via a website, SMS text messages, automated phone calls via interactive voice recognition (IVR) telephone systems, etc. The client software 123a-d may also be used to enforce actions related to the alert notifications. For example, in an embodiment, the client software 123a-d is configured to receive an alert 414 when a user's activity or productivity is below a certain activity or productivity threshold. In response to receiving the alert, the client software 123a-d is configured to present a pop-up message to the user, and prevent the user from using certain "non-productive" applications until the user's activity or productivity metrics are above the threshold.

In an embodiment, an alert 414 is an activity alert. Upon accessing the activity data, the activity alert analyzes the data to determine whether a user's activity has surpassed a predetermined threshold. The predetermined threshold may be an indicator of poor activity (e.g., less than 70% activity). The foregoing embodiment of an activity alert is just one example of how an alert 414 can use activity data to provide managers 170a-b and users of client devices 110 with useful data.

Figure 7:
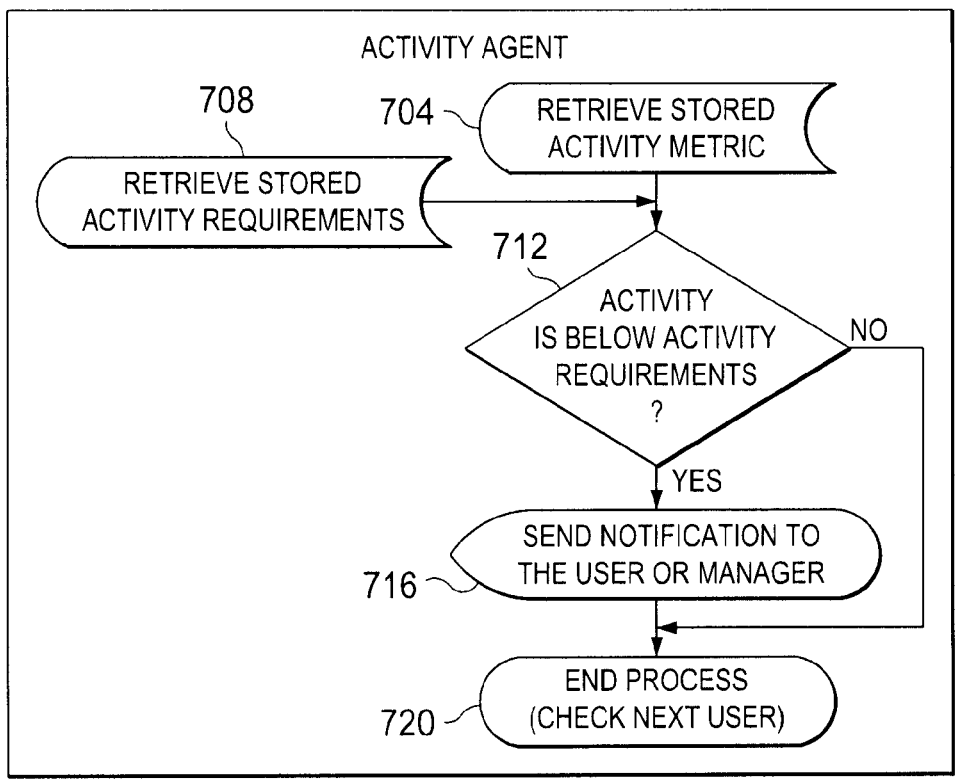
FIG. 7 is a flowchart of a method that may be implemented by an activity alert that embodies aspects of the present disclosure.

FIG. 7 shows a method 700 that may be implemented by an activity alert. The method 700 begins at block 704 by loading user activity data from the database 130. At block 708, activity requirements are loaded from the database 130. These activity requirements are defined by one or more managers 170a-b. In another embodiment, activity requirements are defined by the averages derived from activity information of all users of a predefined group (e.g., average activity of all users in a group). In yet another embodiment, activity requirements are based on historical user activity. For example, activity requirements may be based on averages derived from a user's past activity for a certain period of time (e.g., average use of an application over the last month).

Proceeding to block 712, the user activity data is compared to the activity requirements. If the user activity data is below a predetermined threshold with respect to the activity requirement, then at block 716, a notification is sent to the manager and/or the user. The method 700 ends with respect to a first user at block 720, and repeats for a second user back at block 704.

Figure 8:
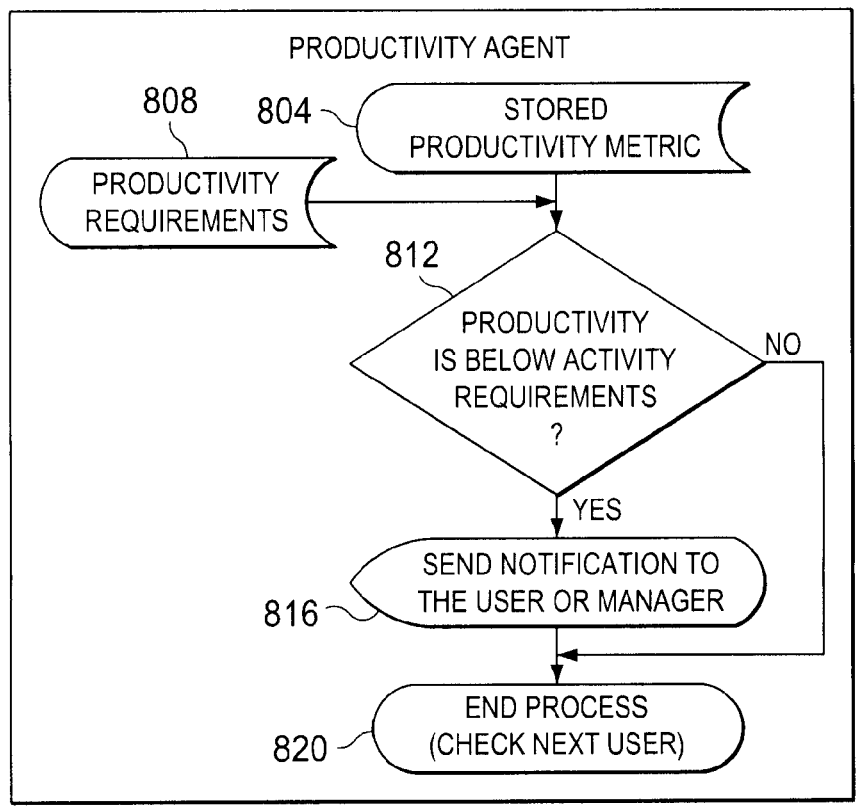
FIG. 8 is a flowchart of a method that may be implemented by a productivity alert that embodies aspects of the present disclosure.

FIG. 8 shows a method 800 that may be implemented by a productivity alert. The method 800 begins at block 804 by loading user productivity data from the database 130. At block 808, productivity requirements are loaded from the database 130. These productivity requirements are defined by one or more managers 170a-b. In another embodiment, productivity requirements are defined by the averages derived from productivity information of all users of a predefined group (e.g., average productivity of all users in a group). In yet another embodiment, productivity requirements are based on historical user productivity. For example, productivity requirements may be based on averages derived from a user's past productivity for a certain period of time (e.g., average productivity over the last month).

Proceeding to block 812, the user productivity data is compared to the productivity requirements. If the user productivity data is below a predetermined threshold with respect to the productivity requirement, then at block 816, a notification is sent to the manager and/or the user. The method 800 ends with respect to a first user at block 820, and repeats for a second user by returning to block 804.

Figure 9:
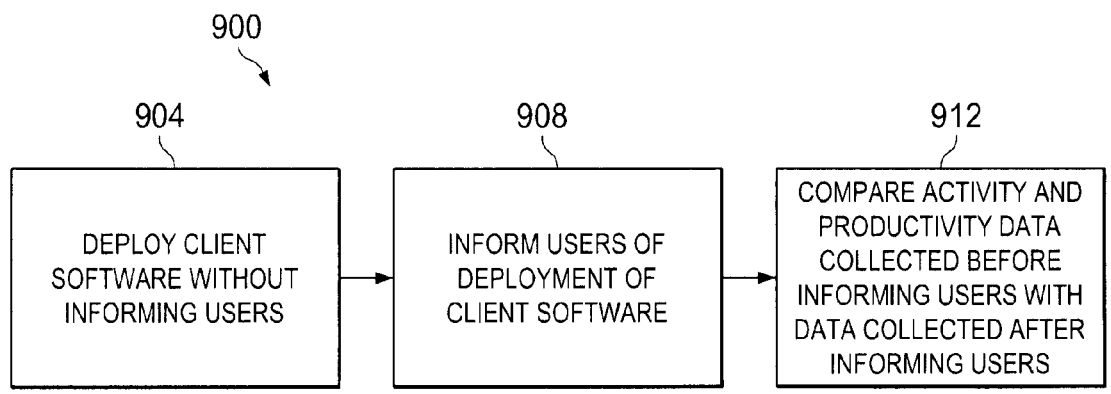
FIG. 9 is a flowchart of a method for implementing systems that embody aspects of the present disclosure.

FIG. 9 is a flowchart of a method 900 for implementing systems that embody the present disclosure. At block 904, client software 123a-d is deployed on client devices 110 without first informing users of the client devices 110. This allows managers 170a-b to build a baseline of user activity information that is not biased by changes in user activity that may occur as a result of knowing that their activity is being monitored. After collecting unbiased activity information over a period of time, the method 900 proceeds to block 908, where the managers 170a-b inform users that the client software 123a-d has been deployed on the client devices 110. At block 912, the activity and productivity data collected after this announcement can then be compared to the activity and productivity data collected before the announcement. Upon comparing the before and after data at block 912, an organization can evaluate how implementation of the embodiments of the present disclosure has improved the productivity of an organization's members.

Figure 10:
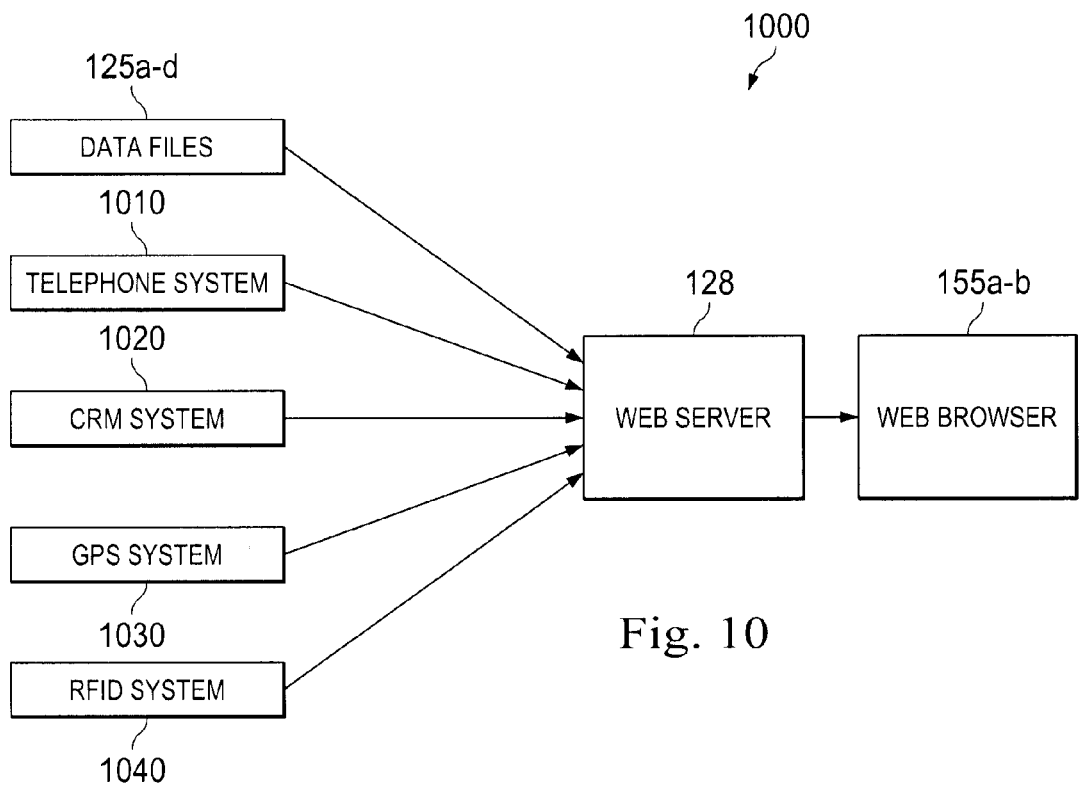
FIG. 10 is a system that embodies aspects of the present disclosure.

Although the foregoing embodiments are described with respect to computer-related application usage, aspects of the present disclosure may also extend to other systems of an organization's enterprise. FIG. 10 shows a system 1000 that uses computer application activity data and data from one or more of an organization's telephone systems 1010, CRM systems 1020, GPS systems 1030, and RFID systems 1040, to produce activity and productivity metrics.

The system 1000 works similarly to system 100. However in the system 1000, the client software 123*a-d* is adapted to retrieve data related to telephone activity from the telephone systems 1010. Such telephone systems 1010 may include private branch exchange (PBX) systems, voice-over-IP (VOIP) systems, or other systems that maintain telephone activity data. The telephone data may be related to land-based telephone activity, as well as mobile phone activity.

The data retrieved from the telephone systems is then sent to the web server 128 for processing. The web server 128 processes the telephone data, and produces activity and productivity metrics by combining the telephone data with other activity data. In another embodiment, the activity and productivity metrics are based on the telephone data alone. For example, in an embodiment, the telephone activity data (e.g., outgoing and incoming phone calls made) can be compared against customer contact data from a customer contact database, and calls to and from customer phone numbers may be classified as productive.

In another embodiment, the client software 123*a-d* accesses CRM data maintained by a CRM system 1020 that is used by the members of the organization to evaluate CRM productivity. Such CRM systems 1020 may include data related to a members' use of the organization's telephone systems. CRM data may also be stored in various other CRM-related systems 1020 that store data related to contacts, leads, and sales.

When using CRM data to evaluate productivity, a factor in determining productivity metrics may include a members' sales data (e.g., successfully making a sale based on a lead), telephone activity (e.g., average call length), and computer activity. For example, CRM data allows a manager or user of a client device 110 to obtain the following metrics: individual or group sales conversion ratios; telephone-related activity of an individual or group (e.g., calls per day); identification of individuals that are below and/or above the average sales to conversion ratios for a group; individual and group sales for a predetermined period of time; and identification of any correlations between computer and/or telephone activity with respect to sales.

Embodiments of the invention that are adapted for use with a CRM system 1020 may be similar to the embodiments described above. For example, the client software 123*a-d* described in the foregoing embodiments may be adapted to retrieve information from an organization's CRM systems 1020, and send the CRM data to the web server 128 for processing. The web server 128 processes the CRM data, and produces activity and productivity metrics by combining the CRM data and other activity data. In another embodiment, the activity and productivity metrics are based on the CRM data alone.

In yet another embodiment, client software 123*a-d* is adapted to collect data from an organization's GPS systems 1030 and combine GPS-related data with activity data collected by any of the embodiments disclosed herein. Such GPS systems 1030 provide location-tracking information that can be used to produce activity and productivity metrics.

In an embodiment, a client device 110 includes a GPS system 1030 that is integrated with an organization's vehicle. In such an embodiment, the client software 123*a-d* is adapted to retrieve information from the GPS system 1030, and send the data to the web server 128 for processing. The web server 128 processes the GPS data, and produces activity and productivity metrics using the GPS data and other activity data. In another embodiment, activity and productivity metrics are based on GPS data alone.

In an exemplary scenario, an organization member's desktop computer that is located in his office may show that the member's application activity on the desktop computer is low compared to other members of the organization. However, GPS data may show that the user spends a large amount of time at a client location. In such a scenario, when evaluating the user's productivity, the GPS data may be cross-referenced against a customer contact database that includes customer locations.

RFID technology may also be integrated with embodiments of the present disclosure. RFID technology is often used to transmit information associated with an object (e.g., a product or a person) that is carrying a RFID transmitter. In an embodiment, RFID technology is used to track an object's movement within an organization's facilities. This tracking information is stored in an RFID system 1040. The client software 123*a-d* is adapted to access the RFID systems 1040 containing this tracking information, and send the tracking information to the web server 128 for further processing. The web server 128 then uses the tracking information and other activity data to evaluate productivity. For example, the tracking information may be combined with computer application activity data to obtain refined productivity data. In an exemplary scenario, a user's computer application activity data may indicate that the user's activity on the desktop computer in his office is low. However, the tracking information may indicate that he is spending a majority of his time in a conference room using productive applications on his laptop.

Activity and productivity data that is collected and evaluated using embodiments of the present disclosure can be used to increase productivity within an organization. For example, human resource professionals can use such data to monitor an organization's activity and productivity. The ability to monitor user activity and productivity can help members of an organization understand how client devices 110 and other technologies are used.

While specific embodiments have been illustrated and described in detail in the drawings and foregoing description, this is to be considered illustrative and not restrictive in character. It is understood that one of ordinary skill will be able to effect various alterations, substitutions of equivalents, and other modifications without departing from the concepts disclosed herein. For example, the embodiments described herein are client-server "software as a service" (SaaS) implementation models. Although, the processing of activity and productivity data are described herein as taking place primarily on the web server 128, it is also possible to use other computing models wherein the processing of activity and productivity data takes place on a client device 110, or on other computers within an organization's enterprise.

Embodiments of the present disclosure are not limited to use within a corporate environment. That is, embodiments of the present disclosure may be extended to any scenario where monitoring the activity of a client device is desired, including without limitation, personal or other non-corporate environments.

In an embodiment, the client software 123a-d may be installed on a mobile phone, so that parents or other non-corporate users can monitor usage of the mobile phone. Parents can use such an embodiment to monitor their children's mobile phone activities. The client software 123a-d may be adapted to monitor activity information, such as incoming and outgoing text messages, web usage, and other functionality available through the mobile phone. The client software 123a-d may then provide the activity data to the web server 128 for processing, as disclosed above with respect to other embodiments. Further, as disclosed in other embodiments, parents may configure and view activity and productivity metrics using the web server 128.

In another embodiment, the client software 123a-d may be installed on a desktop or notebook computer that is used in a non-corporate environment. The client software 123a-d may be adapted to monitor activity information, such as application usage. Such an embodiment would operate similarly to the other embodiments described herein, except that the users may be members of a family, or any other non-corporate users.

We claim:

1. A method comprising:
    collecting user activity data from a client device relating to operation of a first and a second software application;
    defining an activity-productivity map that defines a rule for determining a unit of productivity based on the activity data, the activity-productivity map based at least in part on a first productivity ratio for the first software application and a second productivity ratio for the second software application, wherein each of the first productivity ratio and the second productivity ratio includes a predefined multiplier to be applied to a user's total activity with respect to the respective software application to determine how much of a user's activity with respect to the respective software application should be considered productive, and at least one of the first and second productivity ratios is different between a first user group and a second user group;
    comparing telephone activity data with customer contact information to determine whether a call is one of: to a customer and from a customer;
    classifying the call as productive based on the call being one of: to a customer and from a customer;
    determining a productivity metric using the rule of the activity-productivity map for determining the unit of productivity and using a classification of the call as productive; and
    providing a visual representation of the productivity metric.

2. The method of claim 1, wherein the client device is a computing device, and the user activity data includes an amount of time that a user uses an application deployed on the client device.

3. The method of claim 1, further comprising determining if the productivity metric satisfies a productivity requirement.

4. The method of claim 3, further comprising sending an alert if the productivity metric satisfies the productivity requirement.

5. The method of claim 1, wherein determining the productivity metric further comprises using telephone data provided by a data source.

6. The method of claim 1, wherein determining the productivity metric further comprises using CRM data provided by a data source.

7. The method of claim 1, wherein determining the productivity metric further comprises using GPS data provided by a data source.

8. A system for evaluating productivity, wherein the system includes:
    a client device configured to maintain a record of activities performed on the client device;
    a server that is communicably coupled to the client device, wherein the server is configured to:
        maintain an activity-productivity map that defines a rule defining a first productivity ratio for a first software application and a second productivity ratio for a second software application, wherein each of the first productivity ratio and the second productivity ratio includes a predefined multiplier to be applied to a user's total activity with respect to the respective software application to determine how much of a user's activity with respect to the respective software application should be considered productive,
        compare telephone activity data to customer contact information, classify a call as productive based on the comparison determining that the call was one of: to a customer and from a customer,
        determine a productivity metric using the record of user activities the rule defining the first and second productivity ratios, and the classification of the call as productive.

9. The system of claim 8, wherein the client device is a computing device, and the activity data includes an amount of time that a user uses an application deployed on the client device.

10. The system of claim 8, wherein the server is further configured to determine if the productivity metric satisfies a productivity requirement, and send an alert to a user of the client device if the productivity metric satisfies the productivity requirement.

11. The system of claim 8, further comprising a telephone system that is communicably coupled to the server, and wherein the telephone system maintains the telephone usage data.

12. The system of claim 8, further comprising a CRM system that is communicably coupled to the server, and wherein the CRM system maintains CRM data, and wherein the server is configured to determine the productivity metric using the CRM activity data.

13. The system of claim 8, further comprising a GPS system that is communicably coupled to the server, and wherein the GPS system maintains GPS data, and wherein the server is configured to determine the productivity metric using the GPS activity data.

14. A computer having a non-transitory computer-readable medium, and a processor configured to execute instructions stored on the non-transitory computer-readable medium, wherein the non-transitory computer-readable medium instructions comprise:
    instructions for correcting user activity data from a client device;
    instructions for defining an activity-productivity map that defines a rule for determining a unit of productivity based on the activity data utilizing a first productivity ratio for a first software application and a second productivity ratio for a second software application, wherein each of the first productivity ratio and the second productivity ratio includes a predefined multiplier to be applied to a user's total activity with respect to the respective software application to determine how much of a user's activity with respect to the respective software application should be considered productive;

instructions for classifying a call as productive based on the call being one of: to a customer and from a customer;

instructions for determining a productivity metric using the user activity data, the rule to determine the unit of productivity, and the classifying of the call as productive; and instructions for providing a visual representation of the productivity metric.

15. The computer of claim 14, wherein the client device is a computing device, and user activity data includes an amount of time that a user uses an application deployed on the client device.

16. The computer of claim 14, wherein the instructions further comprise instructions for determining if the productivity metric satisfies a productivity requirement, and instructions for sending an alert if the productivity metric satisfies the productivity requirement.

17. The method of claim 2, wherein the user activity data further includes an amount of time that a user uses each of a plurality of applications deployed on the client device.

18. The method of claim 6, wherein the CRM data provided by the data source includes one of a measure of client sales conversions and a measure of telephone usage.

19. The method of claim 7, wherein the GPS data provided by the data source includes location-tracking information.

20. The method of claim 7, wherein the determining of the productivity metric includes cross-referencing the GPS data with a customer location.

21. The method of claim 1, wherein the client device includes a mobile device, and wherein the mobile device runs the first and the second software application.

22. The method of claim 1, wherein the providing of the visual representation of the productivity metric provides the visual representation to the client device.

23. The method of claim 22, wherein the client device includes a mobile device, and wherein the providing of the visual representation of the productivity metric provides the visual representation to the mobile device.

* * * * *